(12) United States Patent
Watkins (10) Patent No.: US 10,567,398 B2
(45) Date of Patent: Feb. 18, 2020

(54) METHOD AND APPARATUS FOR REMOTE MALWARE MONITORING

(71) Applicant: The Johns Hopkins University, Baltimore, MD (US)

(72) Inventor: Lanier A. Watkins, Newark, DE (US)

(73) Assignee: The Johns Hopkins University, Baltimore, MD (US)

( * ) Notice: Subject to any disclaimer, the term of this patent is extended or adjusted under 35 U.S.C. 154(b) by 261 days.

(21) Appl. No.: 14/964,010

(22) Filed: Dec. 9, 2015

(65) Prior Publication Data

US 2017/0171226 A1 Jun. 15, 2017
US 2019/0116191 A9 Apr. 18, 2019

Related U.S. Application Data

(63) Continuation-in-part of application No. 14/462,828, filed on Aug. 19, 2014, now Pat. No. 9,961,133.

(60) Provisional application No. 61/899,447, filed on Nov. 4, 2013, provisional application No. 61/985,131, filed on Apr. 28, 2014.

(51) Int. Cl.
  *H04L 29/06* (2006.01)
  *H04L 12/26* (2006.01)
  *H04W 24/08* (2009.01)

(52) U.S. Cl.
  CPC ...... *H04L 63/1416* (2013.01); *H04L 43/0852* (2013.01); *H04L 43/10* (2013.01); *H04L 63/145* (2013.01); *H04W 24/08* (2013.01)

(58) Field of Classification Search
  CPC ............... H04L 63/1416; H04L 63/145; H04L 43/0852; H04L 43/10; H04W 24/08
  See application file for complete search history.

(56) References Cited

U.S. PATENT DOCUMENTS

| | | | |
|---|---|---|---|
| 7,945,955 B2 | 5/2011 | Katkar | |
| 8,020,207 B2* | 9/2011 | Chow | H04L 63/1458 713/194 |
| 8,166,544 B2* | 4/2012 | Memon | H04L 63/1416 709/224 |
| 8,321,941 B2 | 11/2012 | Tuvell et al. | |
| 8,590,045 B2 | 11/2013 | Niemela et al. | |

(Continued)

OTHER PUBLICATIONS

Watkins et al., Using network traffic to remotely identify the type of applications executing on mobile devices, May 2013, ResearchGate (Year: 2013).*

(Continued)

*Primary Examiner* — Jeffrey Nickerson
*Assistant Examiner* — Louis C Teng
(74) *Attorney, Agent, or Firm* — Todd R. Farnsworth (57) ABSTRACT

A method executable via operation of configured processing circuitry to identify applications by remote monitoring may include initiating remote communication with a target device through an access point, the access point providing network access to the target device, providing a series of ping messages to the target device via the access point to determine a delay signature of an application running on the target device, comparing the delay signature of the application to a plurality of malware traffic signatures stored in a malware traffic signature library, and determining a matching score between the delay signature of the application and at least some of the malware traffic signatures.

14 Claims, 5 Drawing Sheets

(56) References Cited

U.S. PATENT DOCUMENTS

| | | | |
|---|---|---|---|
| 8,763,126 B2 | 6/2014 | Wang et al. | |
| 8,844,038 B2 | 9/2014 | Niemela | |
| 9,485,272 B1* | 11/2016 | Roundy | H04L 63/145 |
| 9,614,682 B2* | 4/2017 | Buldas | H04L 9/3247 |
| 2002/0186660 A1* | 12/2002 | Bahadiroglu | H04L 29/06 |
| | | | 370/248 |
| 2011/0004575 A1* | 1/2011 | Yang | G06F 1/3203 |
| | | | 706/12 |
| 2011/0145920 A1* | 6/2011 | Mahaffey | G06F 21/564 |
| | | | 726/22 |
| 2011/0197278 A1* | 8/2011 | Chow | H04L 63/1416 |
| | | | 726/24 |
| 2012/0167218 A1 | 6/2012 | Poornachandran et al. | |
| 2012/0260304 A1 | 10/2012 | Morris et al. | |
| 2013/0232251 A1* | 9/2013 | Pauley | H04L 63/306 |
| | | | 709/224 |
| 2014/0143875 A1 | 5/2014 | Tikkanen et al. | |
| 2014/0150102 A1* | 5/2014 | Wang | H04L 63/1416 |
| | | | 726/23 |
| 2015/0082430 A1* | 3/2015 | Sridhara | G06F 21/566 |
| | | | 726/23 |
| 2015/0295720 A1* | 10/2015 | Buldas | H04L 9/3247 |
| | | | 713/176 |
| 2016/0072834 A1* | 3/2016 | Bott | H04L 63/1425 |
| | | | 726/1 |

OTHER PUBLICATIONS

Watkins et al., A Passive Solution to the CPU Resource Discovery Problem in Cluster Grid Networks, Mar. 2011, IEEE (Year: 2011).*

* cited by examiner

METHOD AND APPARATUS FOR REMOTE MALWARE MONITORING

CROSS-REFERENCE TO RELATED APPLICATIONS

This application is a continuation-in-part of U.S. application Ser. No. 14/462,828, filed on Aug. 19, 2014, which claims the benefit of U.S. Provisional Application No. 61/899,447, filed on Nov. 4, 2013 and U.S. Provisional Application No. 61/985,131, filed on Apr. 28, 2014.

TECHNICAL FIELD

Example embodiments generally relate to techniques for remote monitoring and, in particular, relate to apparatuses (and/or methods executable by configured apparatuses) that are configured for employing the same to remotely detect malware running on a device.

BACKGROUND

Enterprises and other organizations that utilize network communications have long sought to enhance their security management capabilities. In some cases, such organizations may employ so-called "bring your own device" environments in which limited applications are allowed for use on the network. Such environments may allow the enterprise to check for malware using, for example, mobile device managers (MDMs). However, even in these environments, anti-virus security measures can be subverted by malware. Furthermore, MDMs typically require a maintenance intensive program to continuously update and patch software that is installed on every device that is to be monitored.

Accordingly, it may be desirable to generate monitoring methods that avoid the limitations described above.

BRIEF SUMMARY OF SOME EXAMPLES

Some example embodiments may enable the provision of a remote monitoring device that can remotely monitor network-based processes such as particular applications on devices operating in the network. As such, for example, monitoring may be accomplished to determine when malware is executing on a device (e.g., a mobile device) without any native network traffic being generated from the device. In this regard, for example, some embodiments may enable the provision of a configurable tool for inconspicuously soliciting network traffic from mobile devices by pinging the devices and then, based on device response, determining whether malware is being run.

In one example embodiment, an apparatus for identifying malware by remote monitoring is provided. The apparatus may include processing circuitry configured for initiating remote communication with a target device through an access point, the access point providing network access to the target device, providing a series of ping messages to the target device via the access point to determine a delay signature of an application running on the target device, comparing the delay signature of the application to a plurality of malware traffic signatures stored in a malware traffic signature library, and determining a matching score between the delay signature of the application and at least some of the malware traffic signatures.

In another example embodiment, a method executable via operation of configured processing circuitry to identify malware by remote monitoring is provided. The method may include initiating remote communication with a target device through an access point, the access point providing network access to the target device, providing a series of ping messages to the target device via the access point to determine a delay signature of an application running on the target device, comparing the delay signature of the application to a plurality of malware traffic signatures stored in a malware traffic signature library, and determining a matching score between the delay signature of the application and at least some of the malware traffic signatures.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some example embodiments may relate to the provision of remote monitoring capabilities. As such, some example embodiments may provide a tool for identifying whether malware is running on a device remotely. Moreover, example embodiments may be able to remotely identify the malware executing on the device (e.g., a mobile device) based on delay signatures of known malware without requiring software to be loaded onto the monitored device.

Figure 1:
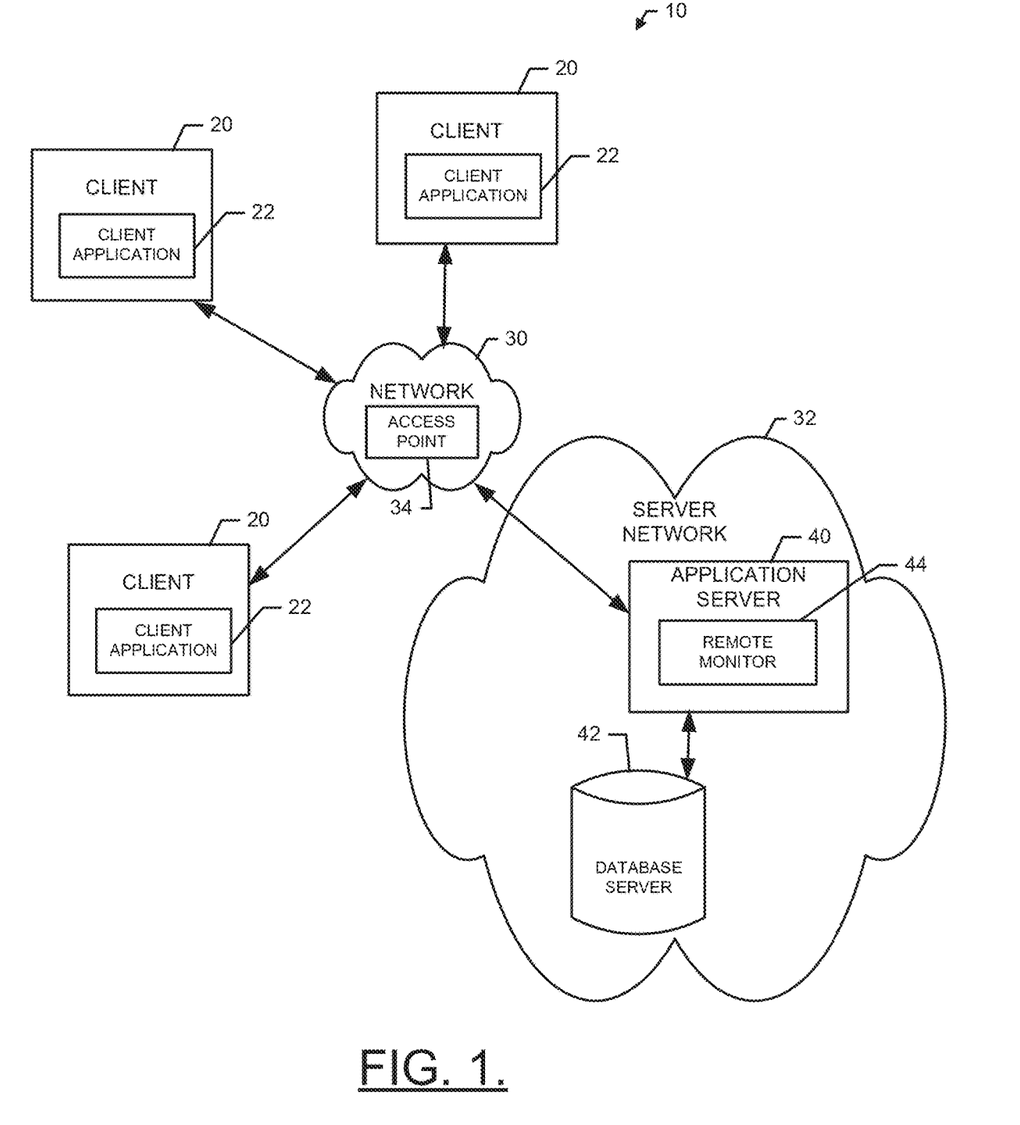
FIG. 1 illustrates a functional block diagram of a system that may be useful in connection with remote monitoring according to an example embodiment.

An example embodiment of the invention will now be described in reference to FIG. 1. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced in connection with a single client connected to the system 10.

The example described herein will be related to an asset comprising a programmed computer or analysis terminal to illustrate one example embodiment. However, it should be appreciated that example embodiments may also apply to any asset including, for example, any programmable device that is capable of interacting with a network access point to monitor the communications between the network access point and various network devices that may execute applications on or in association with the network as described herein.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding individuals, locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with or over a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing instructions to execute a particular application that can be monitored and classified remotely as described in greater detail below.

The client application 22 may be one of a selected group of applications executable at the clients 20, and the client applications on each device may be the same or different. Moreover, the clients 20 may execute the same or different applications simultaneously or at different respective times. Each respective one of various distinct examples of client applications 22 may have distinct communication characteristics associated therewith relative to the communication that occurs via the network 30 to support execution of the corresponding client application 22. As will be seen below, the distinct communication characteristics may be useful for determining whether one of the client applications 22 that is executing on any given one of the clients 20 is malware via remote monitoring in accordance with an example embodiment.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information (e.g., in the database server 42) descriptive of certain communication patterns or traffic signatures associated with software execution at remote terminals being monitored. The information may also or alternatively include a program or series of executable files and/or instructions that are executable for analysis using a tool of an example embodiment. The application server 40 may host functionality for analyzing monitored communication data associated with a remote terminal in accordance with an example embodiment. Alternatively or additionally, the application server 40 may be configured to provide analytical tools for use by the clients 20 to conduct such analysis in accordance with example embodiments.

In some embodiments, for example, the application server 40 may therefore include an instance of remote monitor 44 comprising stored instructions for handling activities associated with practicing example embodiments as described herein. However, it should be appreciated that the remote monitor 44 could be a standalone device in some cases, so it need not be a part of a server or a server network. In some cases, the remote monitor 44 may be employed to monitor the activity of one or more mobile devices (e.g., the clients 20) to determine whether applications (e.g., client applications 22) being executed on the corresponding mobile devices being monitored are malware based at least in part on the communication patterns or traffic signatures associated with execution of the applications.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the remote monitor 44 configured to operate in accordance with an example embodiment of the present invention. In this regard, for example, the remote monitor 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access point 34 (e.g., a wireless communication access point) via which the clients 20 may interact with the network 30. As such, the environment of FIG. 1 illustrates an example in which provision of content and information associated with the execution of applications at the clients 20 via, for example, wireless communication of any type (e.g., WiFi, 3G, 4G, LTE, etc.) with the network 30 may be monitored by the remote monitor 44 as described herein.

Figure 2:
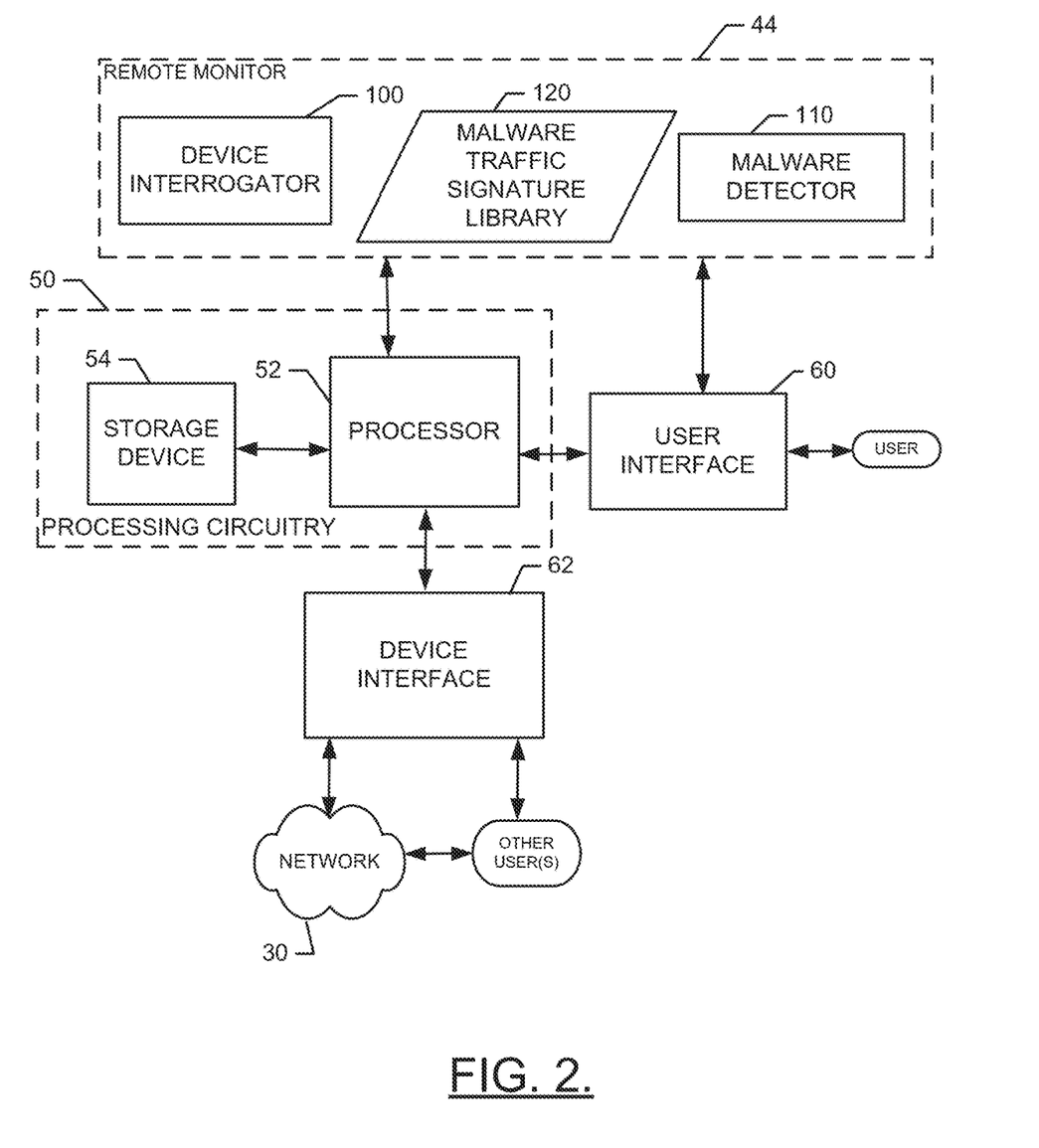
FIG. 2 illustrates a functional block diagram of an apparatus that may be useful in connection with remote monitoring according to an example embodiment.

An example embodiment of the invention will now be described with reference to FIG. 2. FIG. 2 shows certain elements of an apparatus for provision of the remote monitoring described herein according to an example embodiment. The apparatus of FIG. 2 may be employed, for example, on a device such as, for example, a network device, server, proxy, or the like (e.g., the application server 40 of FIG. 1) at which the remote monitor 44 may be instantiated. Alternatively, embodiments may be employed on a combination of devices. Accordingly, some embodiments of the present invention may be embodied wholly at a single device (e.g., the application server 40) or in a distributed environment (e.g., at a plurality of servers of the server network 32). Furthermore, it should be noted that the devices or elements described below may not be mandatory and thus some may be omitted in certain embodiments.

Referring now to FIG. 2, an apparatus for provision of remote monitoring for analyzing software applications run at one or more client devices in accordance with an example embodiment is provided. The apparatus may be an embodiment of the remote monitor 44 or a device hosting the remote monitor 44. As such, configuration of the apparatus as described herein may transform the apparatus into the remote monitor 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 (which may be optional) and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 (if employed at all) may be disposed at another device (e.g., at a computer terminal or client device such as one of the clients 20) that may be in communication with the processing circuitry 50 via the device interface 62 and/or a network (e.g., network 30).

The user interface 60 (if employed) may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located. In some cases, the user interface 60 may also include a series of web pages or interface consoles generated to guide the user through various options, commands, flow paths and/or the like for control of or interaction with the remote monitor 44.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the remote monitor 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the remote monitor 44 as described below.

The remote monitor 44 may be configured to remotely infer information about the application(s) running on one or more devices (e.g., mobile devices such as clients 20). In particular, the remote monitor 44 may be configured to remotely determine whether the application running on a particular mobile device is malware based on a network traffic signature generated by the mobile device. As such, for example, the remote monitor 44 may interact with the remote device to monitor the performance of the on-demand governor of the device relative to CPU throttling and/or other communication related activities that generate a traffic signature in order to determine whether the traffic signature of the application being executed matches a reference traffic signature of known malware. CPU throttling scales the CPU performance of the mobile device (or any other client 20) according to the needs of the presently running application or applications on the device in an effort to save power. By monitoring the CPU throttling activity on the device, embedded delays can be extracted from solicited Internet Control Message Protocol (ICMP) network traffic. This information may be useful in identifying the application for any number of networks and/or devices (e.g., Android devices, Apple devices, and/or the like). Additionally or alternatively, this information and other characteristics of the network traffic generated by the application may provide a traffic signature by which classification may be possible.

Essentially, the remote monitor 44 may be configured to recognize "application footprints" for various different applications or application types. The remote monitor 44 may be configured to utilize these application footprints (i.e., traffic signatures) as an initial step in white listing or black listing for specific situations where mobile devices produce no network traffic. This may fill a monitoring void that cannot be filled by traditional intrusion detection systems that require natively generated traffic for operation. Example embodiments may therefore enable operation of a remote monitor such that network based monitoring can occur without any software being installed on any of the devices being monitored. In some cases, mobile devices executing applications from multiple vendors may be evaluated to identify specific traits that can be detected for assisting in application identification. Moreover, in some cases, the remote monitor 44 may remotely identify application types on the basis of certain classifications that are determinable based on the impact on the CPUT of the executing device (e.g., CPU intensive, I/O intensive or non-CPU intensive applications).

In an example embodiment, the remote monitor 44 may include a device interrogator 100 and a malware detector 110 to conduct at least some of the operations of the remote monitor 44. As such, for example, the device interrogator 100 and the malware detector 110 may each be components of executable instructions that are executed to configure the remote monitor 44 to perform the corresponding functionality described herein by virtue of the configuration defined for each respective component. For example, the device interrogator 100 may be configured to inconspicuously solicit network traffic from the device being monitored (e.g., one of the clients 20). The solicitation may be generated in the form of a ping. The device interrogator 100 may then capture the timestamp of the ICMP replies from the device being monitored. The malware detector 110 may be configured to employ a machine learning technique that has been previously trained on samples of ICMP replies for one or more applications known to be malware. The training on samples of ICMP replies may be an example of employing application fingerprinting or traffic signature analysis to enable malware identification to be conducted. The machine learning technique may involve learning features induced into network traffic by the manner and way that the application uses the shared resources (e.g., CPU, memory, and/or the like) within the devices internal architecture. This feature learning aspect may manifest as the learning of a traffic signature for the application. In particular, the traffic signature may be monitored and learned for a plurality of known malware applications. Moreover, these known malware traffic signatures may be stored for comparison to current traffic signatures generated by remote monitoring of application execution at a device. As such, a malware traffic signature library 120 may be employed by the remote monitor 44 for comparison (by the malware detector 110) to traffic signature (e.g., delay signature) data observed by execution of one of the client applications 22. As such, the malware detector 110 may be trained on traffic signatures of malware, and may be configured to compare presently observed delay signatures to the traffic signatures of malware to determine a matching score between the two. The malware traffic signature library 120 may therefore include information indicative of the delay signature induced into the ICMP responses of a mobile device that is using a shared resource (e.g., CPU, memory) during execution of known malware. The delay signature may be unique to the malware. Thus, the device interrogator 100 may solicit the ICMP replies and the malware detector 110 may use the delay signature indicated by the ICMP replies to calculate a matching score for the application that is running on the mobile device (or remote device, such as any one of the clients 20). If the matching score is above a predetermined threshold for a given traffic signature of known malware, a match may be declared and the corresponding application may be identified as malware.

In some embodiments, the malware traffic signature library 120 may include traffic signatures that can be loaded therein or transferred from a central repository or from an entity that tests and classifies malware. The traffic signatures therein may therefore be actually generated on other hardware or by other devices. The remote monitor 44 may therefore be periodically updated with new traffic signatures for the malware traffic signature library 120 when new malware is identified and the corresponding traffic signature of such new malware has been observed and recorded. The malware detector 110 may therefore be configured to compare a query delay signature for a currently running application to each traffic signature in the malware traffic signature library 120. Malware traffic signatures may then be displayed with a corresponding matching score. In some cases, all malware traffic signatures may have and/or be displayed with a corresponding matching score. However, in other cases, only those that score high and therefore are more likely matches for the query delay signature may be illustrated based on the comparison. In such a case, for example, only those delay signatures that have a matching score above a predefined threshold may be displayed. In other examples, the predetermined threshold may correspond to a matching score that is considered to be sufficient to warrant classifying the currently running application as malware. Thus, the matching score for the highest scoring entry in the malware traffic signature library 120 may be presented along with an identity of the malware traffic signature that was matched.

In some embodiments, the matching score may be a percentage score indicating a percentage chance that the malware traffic signature compared to the query delay signature match or are the same. In other embodiments, the matching score may be a value indicative of the degree of match, but the percentage chance that the malware traffic signature compared to the query delay signature is an exact or near match may be generated using a further algorithm for determining such percentage based on the matching score. In any case, the matching score and/or a percentage certainty of match may be provided in connection with a malware identity determination made by the malware detector 110.

Figure 3:
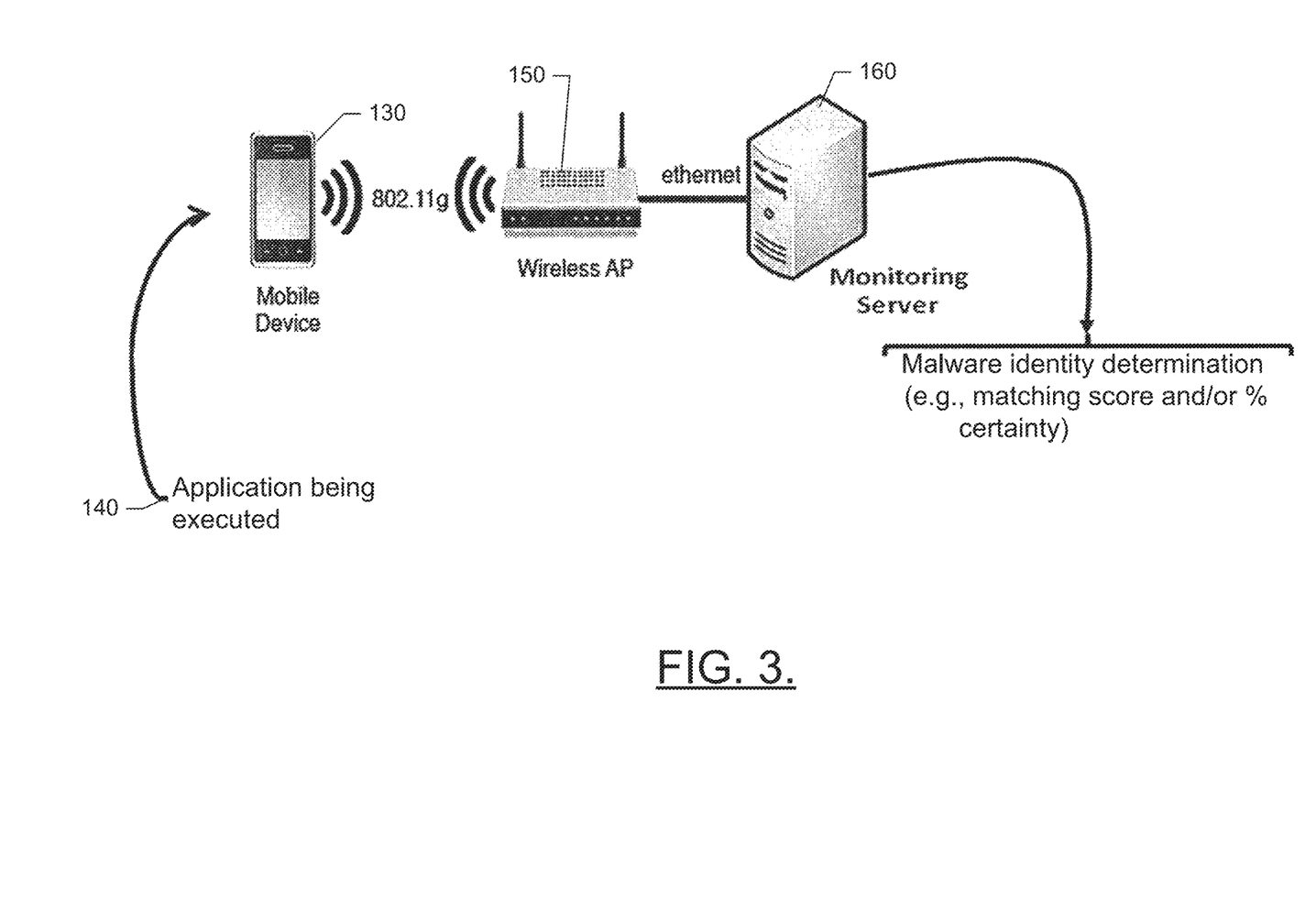
FIG. 3 illustrates an example operating scenario in which a remote monitor may perform an example embodiment.

FIG. 3 illustrates an example operating scenario in which the remote monitor 44 may perform an example embodiment. In this regard, a mobile device 130 may be an example of one of the clients 20. The mobile device 130 may be executing an application 140 that may be an example of client applications 22. A wireless access point 150 may be an example of access point 34. The wireless access point 150 may supply data to the mobile device 130 via a WiFi connection, although other wireless communication protocols may be employed in other embodiments. A monitoring server 160 may be an example of a device at which the remote monitor 44 may be hosted, and the monitoring server 160 may be connected to the wireless access point 150 via an Ethernet connection.

In this example, the remote monitor 44 at the monitoring server 160 may store one or more malware traffic signatures in the malware traffic signature library 120 for comparison to application delay signatures. The remote monitor 44 may ping the mobile device 130 and compare the delays associated with the ICMP replies received, using the timestamps of the ICMP replies, with the malware traffic signatures of the malware traffic signature library 120. As an example, the timestamps of the ICMP replies may be collected into an experimental vector and the machine learning technique described above may be employed to determine a percentage of certainty that the ICMP replies correlate to one of the malware traffic signatures of the malware traffic signature library 120. Thus, for example, if the mobile device 130 is executing malware that has been identified in the malware traffic signature library 120, the malware detector 110 may find a high matching score so that the remote monitor 44 may be enabled to detect the situation remotely. In some cases, the operation of the remote monitor 44 may be enhanced when the WiFi or other wireless signal strength is high, when only one application is running and/or when the user is not interacting heavily with the mobile device.

However, the remote monitor 44 may still operate in some cases, regardless of signal strength, the number of applications running and the amount of user interaction.

Generally speaking, an application may be categorized by the resource that is its limiting factor. For example, a CPU intensive application may be limited by the speed at which calculations can be completed. I/O intensive applications may be limited by the speed at which data can be transferred to and from the source media (e.g., an SD card). Memory intensive applications may be limited by the amount and speed of memory that is available for a process to use. Accordingly, it may be possible to identify or classify applications as being intensive or non-intensive with respect to the demands that the applications have on the above mentioned resources. However, in a simplified example, a limited set of the classifications may be considered. For example, CPU intensive, non-CPU intensive and I/O intensive may be reduced complexity set of application feature profiles that may be employed in an example embodiment. In such an example, the effects on memory can be ignored and the CPU scheduling impacts associated with I/O intensive and CPU intensive applications can be monitored for via monitoring of CPU throttling as described above. In this regard, for CPU intensive applications, the scheduler will be filled with processes that require CPU time, but for non-CPU intensive applications, very few processes will be waiting for the CPU. In contrast, for I/O intensive applications, delays due to waiting on processes to release I/O resources dominate even CPU throttling when the device has an external (i.e., removable) memory such as an SD card.

In Android systems, as an example, the CPU is controlled to manage power consumption. Thus, for example, if the CPU is doing no work, it should use no power. CPU scaling or throttling is therefore employed as a power saving functionality that lowers power consumption by throttling the CPU relative to needs of the device. The CPU throttling may employ a governor to determine the CPU needs of an application being executed. A driver may then move the current CPU frequency to a desired value to achieve CPU throttling or CPU frequency scaling. In some cases, CPU throttling is based on the needs of the foreground process and all running background processes. The number of processes allowed to execute in the background may depend on the amount of memory that is free on the mobile device, and the order in which processes are killed to free up memory may depend on the relative priority of the processes. The default governor, which may be an on-demand governor, may employ a number or variables to support its operation. As an example, the maximum CPU speed may be stored as a variable called $CPU_{max}$. The minimum allowed CPU speed may be stored as a variable called $CPU_{min}$. Another variable called up_threshold may define the maximum CPU load percentage allowable before the governor scales the CPU load up to the next level. The sampling_rate variable may define the rate at which the governor samples the present CPU load. These variables may be used by the on-demand governor to manage CPU speed such that the impact to the power source is minimized. Specifically, the on-demand governor may keep CPU speed at $CPU_{min}$ when the mobile device is not executing any user-space applications, and as soon as the smallest user-space application is run, it may immediately force the CPU speed to $CPU_{max}$ and immediately start to drop CPU speed until just before up_threshold CPU load is exceeded. In other words, the on-demand governor may scale the current CPU speed such that the up_threshold CPU load for the current CPU speed is never exceeded. This occurs until $CPU_{max}$ is reached. Accordingly, CPU speed for CPU intensive applications and non-CPU intensive applications may be defined as follows:

$$CPU\ Intensive >= (up\_threshold) \times (CPU_{max})$$

$$Non\text{-}CPU\ Intensive < CPU\ Intensive.$$

In some operating systems, when the mobile device receives an ICMP request, an interrupt is created, and the process that has access to the CPU is preempted, its context is stored, and the interrupt is handled. Then, the ICMP requests are responded to with ICMP replies by kernel-space assembly language subroutines. Finally, these subroutines may be processed faster or slower based on the speed at which the CPU is running when while handling the preempted process. The mobile device's current CPU speed affects the inter-packet spacing (IPS) of network traffic emitted (i.e., ICMP replies) from the mobile device while CPU intensive or non-CPU intensive applications are executing on the mobile device. When I/O intensive applications are executing on the mobile device, the processes of the mobile device may be enabled to delay the kernel-space generated ICMP replies. This delay may result from the time it takes to preempt I/O processes that have use of the CPU and are accessing the SD card. Empirical data supports this theory. Specifically, the IPS of ICMP replies emitted from a mobile device running a non-CPU intensive application is much larger than the IPS of ICMP replies from the same device running a CPU intensive application. Further, the IPS of ICMP replies emitted from a device running an I/O intensive application may be even larger than the IPS of ICMP replies from the same device running a non-CPU intensive application if the I/O processes access an external SD card. Because of this observable behavior, remote identification of a delay signature for the applications running on the mobile device may be accomplished based on these differences in IPS. Moreover, this delay signature can be compared to traffic signature data of known malware. Accordingly, remote determination of whether the processes executed on a device (e.g., a mobile device) is malware may be accomplished when no native traffic is being generated.

In some cases, the operation of example embodiments could be slightly different based on the mode of operation of the device that is being remotely monitored. For example, in a simple case where there are a limited number of modes of operation, an idle mode may be a mode in which the display may be either on or off and the CPU is running at $CPU_{min}$. A user interaction mode would require the display to be on and CPU speed may be greater than $CPU_{min}$, but less than or equal to $CPU_{max}$. In an active mode, the display may be on or off and CPU speed may again be greater than $CPU_{min}$, but less than or equal to $CPU_{max}$. In each mode, the wireless adapter of the device may be turned on. When in the user interaction mode, the user's interaction with the screen typically results in noticeable spikes in CPU speed. However, if the application is a CPU intensive application, then the CPU speed will remain high. In each of these modes, a different threshold for distinguishing between, for example, CPU intensive and non-CPU intensive applications may be defined for comparison to IPS of ICMP replies.

Figure 4:
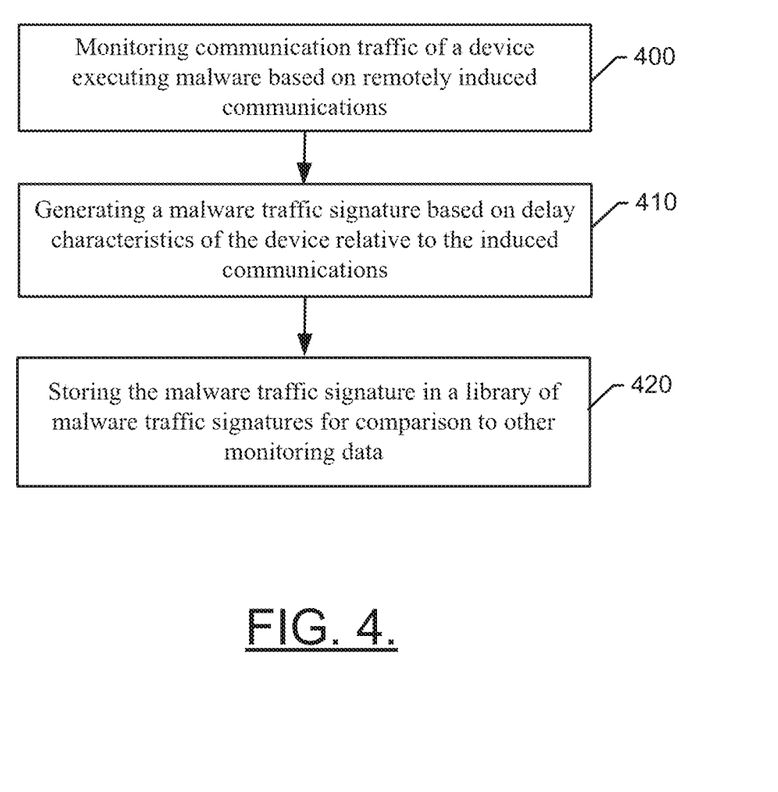
FIG. 4 illustrates a flow chart of a method according to an example embodiment.
Figure 5:
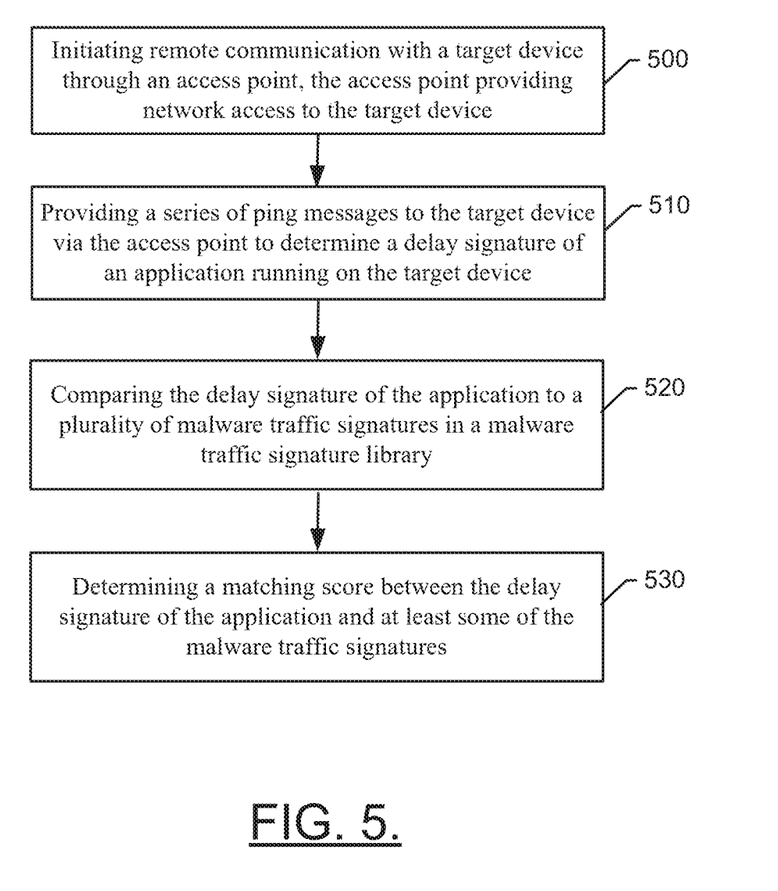
FIG. 5 illustrates a method for identifying malware remotely according to an example embodiment.

A Neural-Fuzzy Classifier (NFC) may be employed (e.g., as an example of the malware detector 110) to create fuzzy membership functions that bind training sets such that the root mean squared error (RMSE) of the correctly classified training patterns is a minimum for a given application. Then the NFC can be used to identify malware applications on which it has been trained. Thus, for example, the NFC may be trained on a plurality of application traffic signatures for known malware. From a technical perspective, the remote monitor 44 described above may be used to support some or all of the operations described above. As such, the platform described in FIGS. 1-2 may be used to facilitate the implementation of several computer program and/or network communication based interactions. As an example, FIGS. 4 and 5 are flowcharts of a method and program product according to an example embodiment of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include monitoring communication traffic of a device executing malware based on remotely induced communications at operation 400. The method may further include generating a malware traffic signature based on delay characteristics of the device relative to the induced communications at operation 400. At operation 420, the malware traffic signature may be stored in a library of malware traffic signatures for comparison to other monitoring data.

The library of malware traffic signatures may form the basis for querying other devices executing applications to remotely determine if such applications are malware applications, as shown in FIG. 5. In this regard, for example, a method of remotely identifying malware applications may include initiating remote communication with a target device (e.g., a mobile device or client 20) through an access point (e.g., a wireless access point) at operation 500. The access point may provide network access to the target device. The method may further include providing a series of ping messages to the target device via the access point to determine a delay signature of an application running on the target device at operation 510. The method may further include comparing the delay signature of the application to a plurality of malware traffic signatures in a malware traffic signature library at operation 520. At operation 530, a matching score may be determined between the delay signature of the application and at least some of the malware traffic signatures.

In an example embodiment, an apparatus for performing the method of FIGS. 4 and 5 above may comprise a processor (e.g., the processor 52) or processing circuitry configured to perform some or each of the operations (400-530) described above. The processor may, for example, be configured to perform the operations (400-530) by performing hardware implemented logical functions, executing stored instructions, or executing algorithms for performing each of the operations. In some embodiments, the processor or processing circuitry may be further configured for additional operations or optional modifications to operations 400 to 530. In this regard, for example, determining the delay signature may include determining an average inter-packet spacing for Internet Control Message Protocol (ICMP) replies to the ping messages. In some cases, each malware traffic signature may include an experimental vector, and the delay signature may be converted to a vector for comparison to the experimental vector to determine the matching score. In an example embodiment, determining the matching score may include determining and displaying a percentage of malware identification certainty for the malware traffic signatures. In some cases, determining the matching score may include determining and displaying an identity of malware corresponding to a malware traffic signature having a highest matching score. In an example embodiment, determining the matching score may further include displaying a percentage of malware identification certainty for the malware traffic signature having the highest matching score. In some cases, the malware traffic signature library may be generated based on: monitoring communication traffic of a remote device executing malware based on remotely induced communications, generating a traffic signature based on delay characteristics of the remote device relative to the induced communications, and storing the traffic signature as a malware traffic signature in the library of malware traffic signatures for comparison to other monitoring data. In an example embodiment, the delay signature is generated utilizing a Neural-Fuzzy Classifier. In some cases, determining the matching score may include determining the matching score without any native network traffic being generated from the target device and without any monitoring software being installed on the target device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus comprising processing circuitry configured to execute instructions for:
   initiating remote communication with a target device through an access point, the access point providing network access to the target device;
   providing a series of ping messages to the target device via the access point;
   determining inter-packet spacing for Internet Control Message Protocol (ICMP) replies to the series of ping messages from the target device;
   generating a delay signature of the target device based on the inter-packet spacing utilizing a Neural-Fuzzy Classifier;
   comparing the delay signature to a plurality of malware traffic signatures stored in a malware traffic signature library; and
   determining a matching score between the delay signature and one or more of the malware traffic signatures.

2. The apparatus of claim 1, wherein each malware traffic signature comprises an experimental vector, and the delay signature is converted to a vector for comparison to the experimental vector to determine the matching score.

3. The apparatus of claim 1, wherein determining the matching score comprises determining and displaying a percentage of malware identification certainty for the malware traffic signatures.

4. The apparatus of claim 1, wherein determining the matching score comprises determining and displaying an identity of malware corresponding to a malware traffic signature having a highest matching score.

5. The apparatus of claim 4, wherein determining the matching score further comprises displaying a percentage of malware identification certainty for the malware traffic signature having the highest matching score.

6. The apparatus of claim 1, wherein the malware traffic signature library is generated based on: monitoring communication traffic of a remote device executing malware based on remotely induced communications, generating a traffic signature based on delay characteristics of the remote device relative to the induced communications, and storing the traffic signature as a malware traffic signature in the library of malware traffic signatures for comparison to other monitoring data.

7. The apparatus of claim 1, wherein determining the matching score comprises determining the matching score without any native network traffic being generated from the target device and without any monitoring software being installed on the target device.

8. A method executable via operation of configured processing circuitry, the method comprising:

initiating remote communication with a target device through an access point, the access point providing network access to the target device;

providing a series of ping messages to the target device via the access point;

determining inter-packet spacing for Internet Control Message Protocol (ICMP) replies to the series of ping messages from the target device;

generating a delay signature of the target device based on the inter-packet spacing utilizing a Neural-Fuzzy Classifier;

comparing the delay signature to a plurality of malware traffic signatures stored in a malware traffic signature library; and determining a matching score between the delay signature and one or more of the malware traffic signatures.

9. The method of claim 8, wherein each malware traffic signature comprises an experimental vector, and the delay signature is converted to a vector for comparison to the experimental vector to determine the matching score.

10. The method of claim 8, wherein determining the matching score comprises determining and displaying a percentage of malware identification certainty for the malware traffic signatures.

11. The method of claim 8, wherein determining the matching score comprises determining and displaying an identity of malware corresponding to a malware traffic signature having a highest matching score.

12. The method of claim 11, wherein determining the matching score further comprises displaying a percentage of malware identification certainty for the malware traffic signature having the highest matching score.

13. The method of claim 8, wherein the malware traffic signature library is generated based on: monitoring communication traffic of a remote device executing malware based on remotely induced communications, generating a traffic signature based on delay characteristics of the remote device relative to the induced communications, and storing the traffic signature as a malware traffic signature in the library of malware traffic signatures for comparison to other monitoring data.

14. The method of claim 8, wherein determining the matching score comprises determining the matching score without any native network traffic being generated from the target device and without any monitoring software being installed on the target device.

* * * * *